Jan. 19, 1965  R. G. HUNTINGTON  3,165,900

THERMOELECTRIC TEMPERATURE AND HUMIDITY CONTROL

Filed May 18, 1962

INVENTOR.
ROBERT G. HUNTINGTON.

BY Raymond Curtin

ATTORNEY.

United States Patent Office 3,165,900
Patented Jan. 19, 1965

---

3,165,900
THERMOELECTRIC TEMPERATURE AND
HUMIDITY CONTROL
Robert G. Huntington, Louisville, Ky., assignor to Carrier
Corporation, Syracuse, N.Y., a corporation of
Delaware
Filed May 18, 1962, Ser. No. 195,907
13 Claims. (Cl. 62—3)

This invention relates to temperature and humidity control devices, more particularly to means implementing the control of reheat and dehumidification of air passing over thermoelectric cooling panels.

A number of situations exist in connection with air conditioning installations where high latent room loads and variable sensible heat factors make it necessary to provide means permitting an increase in conditioned air temperature after cooling of the air which has been necessitated in order to effect desired dehumidification. In these situations, efficient dehumidification requires a substantial lowering of air temperature, often to a point beneath comfort levels. Before the dehumidified air is returned to the conditioned area, it is thus desirable to reheat the air to a comfortable temperature level.

It is with the above considerations in mind, that the present means have been evolved, means including both method and apparatus permitting the use of a thermoelectric panel in conjunction with conventional air supply ducts to effect desired temperature and humidity control of the air supplied via said ducts.

It is accordingly an important object of this invention to provide improved means for utilizing a thermoelectric panel to effect temperature and humidity control.

Another object of the invention is to provide means suitable for installation in conventional air supply ducts to implement the control of temperature and humidity of the air supplied through said ducts.

A further object of the invention is to provide improved temperature and humidity control means particularly adapted in air conditioning installations where the conditioned area is subject to varying sensible heat factors.

These and other objects of the invention which will become hereafter apparent are attained by arrangement of a thermoelectric cooling panel in an air supply duct of an air conditioning system. The cold junctions of the panel are arranged to effect cooling the air to be supplied to the conditioned area. The hot junctions of the thermoelectric panel are arranged to permit selective heating of the conditioned air stream. Selective heating of the conditioned air stream may be obtained either by employing bypass dampers which determine whether the conditioned air passes into heat exchange relationship with the hot junctions, or by controlling the heat available for dissipation from the hot junction to the conditioned air. Means are provided regulating the heat available for dissipation by the hot junction to the air, and the temperature of the cold junctions. A room humidistat is preferably employed for controlling cold junction temperature, and a room thermostat controls the heat available for dissipation to the air from the hot junctions. Thus means are provided controlling temperature and humidity of air supplied to a conditioned area.

An important feature of the invention resides in the use of the thermoelectric cooling panel to effect dehumidification, and permitting use of the heat removed during the dehumidification for selectively reheating the dehumidified air to desired temperature levels.

Another feature of the invention resides in an arrangement of thermoelectric panels in series to implement the attainment of the reheat function without requiring 180° bends in the air supply ducts.

The specific details of a preferred embodiment of the invention, and their mode of functioning will be made most manifest and particularly pointed out in clear, concise, and exact terms in conjunction with the accompanying illustrative drawings, wherein.

Referring now more particularly to the drawings, like numerals in the various figures will be employed to designate like parts.

Figure 1:
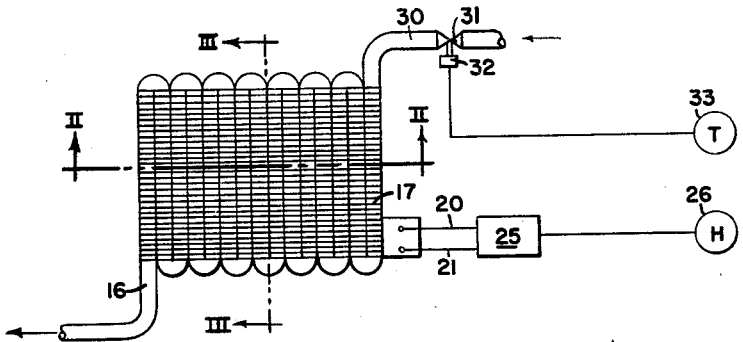
FIGURE 1 is a top plan view of a thermoelectric panel and its associated controls suitable for use in temperature and humidity control.
Figure 2:
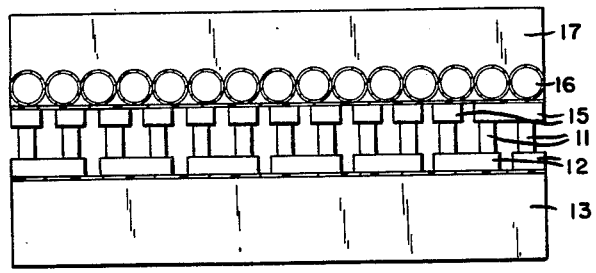
FIGURE 2 is a cross-sectional view taken on line II—II of FIGURE 1.
Figure 3:
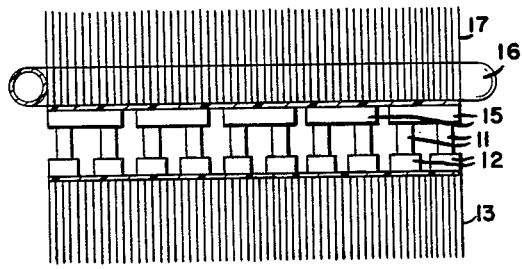
FIGURE 3 is a cross-sectional view taken on line III—III of FIGURE 1.

As best seen in FIGURES 1-3, a thermoelectric panel 10 is provided comprising a plurality of pairs 11 of thermoelectric elements. As will be understood by those skilled in the art, each thermoelectric pair or couple 11 includes a "P" element, and an "N" element, the "P" element being positive with respect to the "N" element. Conductor straps connect the adjoining ends of the alternately arranged elements and define either cold or hot junctions depending on the direction flow of current through the assembly in accordance with the well known Peltier effect. The cold junction 12 between each pair, as best seen in FIGURES 2 and 3 are formed with appropriate cooling fins 13 providing an increased heat transfer surface. The hot junctions 15 formed of copper or the like are arranged in heat exchange relationship with a serpentine water tube 16 as best seen in FIGURE 1. Tube 16 is of a finned type having fins 17 as best seen in FIGURES 1 and 3.

The thermoelectric couples 11 are arranged in a circuit connected by conductors 20 and 21 to a source of D.C. voltage via voltage control apparatus 25. A humidistat 26 located in the conditioned area to which air of desired temperature and humidity levels is to be supplied, regulates the action of D.C. voltage control apparatus 25.

The finned tube 16 is connected to water supply pipe 30 which contains solenoid valve 31 actuated by solenoid coil 32, the energization of which is determined by thermostat 33 arranged to detect the temperature of the conditioned area.

Figure 4:
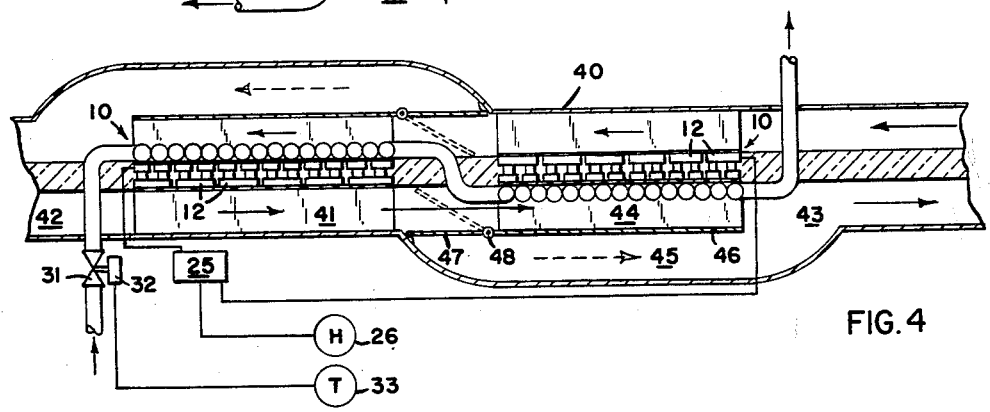
FIGURE 4 is a schematic cross-sectional view through an air conditioning duct in which a series of panels of the type shown in FIGURE 1 have been arranged.

In the arrangement illustrated in FIGURE 4, duct 40 is provided with a plurality of panels 10, two of which are shown schematically in the drawing. Panels 10 are suitably mounted within the duct so that the air passing through the duct will pass in heat exchange relationship with the cold junctions 12 of the thermoelectric panels 10, it being understood that the fins 13 aid in obtaining this heat exchange relationship. Considering the lower half of duct 40, it will be apparent that an air flow path 41 extends between air inlet 42 and conditioned air supply outlet 43. Air flow path 41 constrains air to pass into heat exchange relationship with the cold junctions 12 of panel 10 to the left of the figure and then directs the air stream selectively to either reheat path 44 or bypass 45. Bypass 45 is separated from reheat path 44 by partition 46. As will be apparent to those skilled in the art, the exterior walls of bypass 45 are formed by the wall of duct 40. This can either be coplanar with the rest of the duct wall or arranged in a bubble as illustrated in the drawings.

Damper 47 pivoted at 48 to partition 46 on the downstream side of flow path 41 serves to determine whether the air passing along flow path 41 will be directed along reheat path 44 or bypass 45. No specific control has been illustrated for the positioning of damper 47, but it will be understood by those skilled in the art that damper positioning may be effected either manually by the use of conventional mechanical linkages, or automatically in response to temperature conditions by the utilization of temperature sensitive solenoids or the like mechanisms.

The upper flow path shown in FIGURE 4 has not been assigned numerals, but it will be apparent that it is a substantial duplicate of the structure described at the lower part of duct 40 as viewed in FIGURE 4.

The aforedescribed structure may be most readily utilized to effect temperature and humidity control of the air passing through an air supply duct. Particular utility for the novel arrangement arises in connection with widely varying latent room loads.

In use, either a single thermoelectric panel 10 may be employed in which event the air stream has to be turned through 180° so as to pass over the cold and hot junctions of the thermoelectric panel. In a preferred embodiment of the invention however, a plurality of such panels is utilized, such, for example, as illustrated in FIGURE 4. As seen in FIGURE 4, two panels are supported as a structural member and employed oriented 180° with respect to each other, so that an air stream passing along a straight flow path will normally pass over the cold junctions of one panel and the hot junctions of the other. Considering the lower flow path 41 described above, and labeled on FIGURE 4, it will be seen that the air to be conditioned enters inlet 42, passes into heat exchange relationship with the cold junctions 12 of panel 10 (to the left in the drawing) and then moves either along reheat path 44 or bypass 45 depending on the position of damper 47, and thence outwardly to the conditioned area via outlet 43.

Considering the situation where dehumidification is required, humidistat 26 controls the operation of D.C. voltage control apparatus 25 to provide the energization currents for panels 10. The greater the dehumidification requirements, the greater the amount of current fed to panel 10 with a resultant proportional decrease in temperature of cold junctions 12. As will be understood by those skilled in the art, the lower the temperature of cold junctions 12, the greater the amount of moisture removed from the air passing into heat exchange relationship with the cold junctions. If dehumidification requirements are such that air temperature will be lowered to an undesired level, the room thermostat 33 will sense this causing solenoid 32 to close valve 31 reducing the flow of cooling water through tube 16. Simultaneously, damper 47 will be moved to a position permitting the air to pass along reheat path 44 in heat exchange relationship with the hot junctions of the panels 10. The amount of reheat will be a function of the flow of coolant through tubes 16, since as it is understood the amount of reheat is equal to the total heat rejected by the panel minus the heat transferred to the coolant. Restricting coolant flow causes the finned surface associated with the hot junctions to increase in temperature with a resultant increase in reheat. When the temperature of the conditioned area reaches a desired value, coolant flow is again increased to reduce available reheat.

Under normal conditions of dehumidification operation, dampers 47 will be oriented in the solid line position illustrated in FIGURE 4 with all of the conditioned air moving along flow paths 41 passing along reheat path 44. The amount of reheat provided will be controlled by the action of the thermostat regulating coolant flow.

In order to provide only cooling effects, the dampers 47 are oriented to direct all of the air moving along flow path 41 along bypass path 45, with no reheat provided.

It will be apparent to those skilled in the art that the bypass may be eliminated by designing the panel 10 such that under conditions of full coolant flow through tubes 16, the temperature of any air passing along the reheat path will not be increased above a desired temperature level for the conditioned area. Thus reheat may be controlled solely as a function of coolant flow with no need for bypass paths since under conditions of maximum coolant flow desired air temperatures will result.

It is thus seen that a novel means has been provided permitting the utilization of a thermoelectric panel to provide variable reheat control and dew point control to allow for the flexibility required to meet changing loads in a conditioned area.

The above disclosure has been given by way of illustration and elucidation, and not by way of limitation, and it is desired to protect all embodiments of the herein disclosed inventive concept within the scope of the appended claims.

I claim:

1. In an air conditioning system, including a conditioned air supply duct, means for controlling temperature and humidity of the air passing through said duct, said means comprising: thermoelectric means having a cold junction in heat exchange relationship with the air passing through the air conditioning duct; a hot junction on said thermoelectric means, said hot junction arranged within said duct relative to said cold junction so that air flowing from the cold junction will flow over the hot junction; and control means selectively regulating the transfer of heat from said hot junction to the air passing through the air conditioning duct, whereby under conditions requiring cooling of the air below desired temperature levels in order to obtain desired humidity levels, the temperature of the air may be raised after dehumidification.

2. Means as in claim 1 in which said hot junction is in heat exchange relationship with water supply means.

3. Means as in claim 2 in which said control means comprise: valve means regulating the supply of water from said water supply means; and temperature responsive means actuating said valve means.

4. Means as in claim 1 in which said control means comprise: voltage control means coupled to said thermoelectric means; and humidity responsive means determining the action of said voltage control means to increase or decrease the rate of heat pumping of said thermoelectric means in response to humidity conditions.

5. In an air conditioning system, including a conditioned air supply duct, means for controlling temperature and humidity of the air passing through said duct, said means comprising: thermoelectric means having a cold junction in heat exchange relationship with air furnished to the supply duct; a hot junction on said thermoelectric means, said hot junction arranged within said duct relative to said cold junction so that air flowing from the cold junction will flow over the hot junction; water supply means in heat exchange relationship with said hot junction; valve means regulating the flow of water through said water supply means; voltage control means coupled to said thermoelectric means to determine the rate of heat pumping of said thermoelectric means; and temperature and humidity responsive means determining the action of said voltage control means and said valve means to control the dehumidification and temperature of the air passing through the supply duct.

6. An air conditioning duct thrught which air is directed to a conditioned area, said duct having an air inlet, and an air outlet through which conditioned air may be directed to the conditioned area, a continuous flow path between the air inlet and the air outlet within said duct; a thermoelectric cooling element in heat exchange relationship with all of the air passing over said flow path; a thermoelectric heating element providing heat to the air passing over said flow path, and means for controlling the effectiveness of said thermoelectric heating element whereby temperature and humidity of the air passing through said duct may be controlled.

7. An air conditioning duct as in claim 6 in which said thermoelectric cooling element and said thermoelectric heating element are formed by the cold and hot junctions of a thermoelectric panel.

8. An air conditioning duct as in claim 6 in which means are provided regulating the cooling action of said cooling element and the heating action of said heating element.

9. An air conditioning duct as in claim 6 in which a bypass path is arranged adjacent said heating element to permit selective diversion of the air away from said heating element to permit control of the amount of heat imparted to the air by said heating element.

10. An air conditioning duct as in claim 6 in which a water tube is arranged adjacent said heating element to conduct water in heat exchange relationship with said heating element; and control means regulating water flow through said tube to determine the amount of heat available for heating of the air.

11. In an air conditioning system, including a conditioned air supply duct, the combination of a thermoelectric panel having hot and cold junctions positioned within said duct, the cold junctions of said panel arranged in heat exchange relationship with the air passing through the duct, and the hot junctions arranged to permit selective dissipation of the heat from the hot junction to the air passing through the duct after the air has passed over said cold junctions; a cooling water conduit arranged in heat exchange relationship with the hot junction; and a control valve in said water conduit permitting regulation of the flow of water through said conduit whereby the heat available for dissipation from the hot junctions of said panel to the air will be subject to control.

12. In an air conditioning system as in claim 11 in which said control valve is coupled to a thermostat, with the action of the valve depending on the temperature sensed by said thermostat.

13. In an air conditioning system as in claim 11 in which a voltage control device is coupled to said thermoelectric panel to determine the heat pumping action thereof; and a humidistat is coupled to said voltage control device; whereby the temperature of the cold junctions will be humidity responsive.

References Cited in the file of this patent
UNITED STATES PATENTS

| | | |
|---|---|---|
| 420,641 | Dewey | Feb. 4, 1890 |
| 2,172,877 | Parcaro | Sept. 12, 1939 |
| 2,561,067 | Newton | July 17, 1951 |
| 2,702,456 | Ringquist | Feb. 22, 1955 |
| 2,758,146 | Lindenblad | Aug. 7, 1956 |
| 2,944,404 | Fritts | July 12, 1960 |
| 3,008,299 | Sheckler | Nov. 14, 1961 |
| 3,024,616 | Bury | Mar. 13, 1962 |
| 3,073,127 | Schmerzler | Jan. 15, 1963 |